(12) United States Patent
Berstis et al.

(10) Patent No.: US 6,959,312 B2
(45) Date of Patent: Oct. 25, 2005

(54) FAST PROVISIONING OF STORAGE IN A NETWORK OF PRODUCTION COMPUTERS FOR MINIMIZING INTER-CUSTOMER DELAY

(75) Inventors: Viktors Berstis, Austin, TX (US); Christopher Daniel Reech, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 10/159,754

(22) Filed: May 30, 2002

(65) Prior Publication Data
US 2003/0225799 A1  Dec. 4, 2003

(51) Int. Cl.[7] ............................................. G06F 17/30
(52) U.S. Cl. ...................... 707/204; 707/104.1; 714/13
(58) Field of Search ............................... 707/1.1, 9.1–2, 707/104.1, 204, 205; 709/213, 229; 710/104, 710/302; 712/13; 714/7, 13

(56) References Cited
U.S. PATENT DOCUMENTS

| | | | |
|---|---|---|---|
| 5,125,081 A | * | 6/1992 | Chiba .......................... 710/104 |
| 5,717,942 A | * | 2/1998 | Haupt et al. ................... 712/13 |
| 6,128,750 A | * | 10/2000 | Espy et al. ...................... 714/7 |
| 6,279,001 B1 | | 8/2001 | DeBettencourt .............. 707/10 |
| 6,304,929 B1 | * | 10/2001 | Wallach et al. .............. 710/302 |
| 6,421,711 B1 | * | 7/2002 | Blumenau et al. ........... 709/213 |
| 6,701,453 B2 | * | 3/2004 | Chrabaszcz ................... 714/13 |
| 6,789,122 B1 | * | 9/2004 | Slaughter et al. ........... 709/229 |

* cited by examiner

Primary Examiner—Jeffrey Gaffin
Assistant Examiner—Yicun Wu
(74) Attorney, Agent, or Firm—David A. Mims, Jr.; Rudolf O. Siegesmund

(57) ABSTRACT

A fast provisioning unit is disclosed that contains a basic unit, a duplicating unit and a control unit. The basic unit has a production computer and two or more hard drives each connected to the production computer by a first switch. The duplicating unit has a duplicator that is connected to an image disk and to a second switch. The second switch is connected to the hard drives of the basic unit. The control unit has a computer connected to the first switch, the second switch and the duplicator. The first switch permits the hard drives to be connected or disconnected from the production computer by the control computer pursuant to instructions from control software.

5 Claims, 7 Drawing Sheets

FAST PROVISIONING OF STORAGE IN A NETWORK OF PRODUCTION COMPUTERS FOR MINIMIZING INTER-CUSTOMER DELAY

FIELD OF THE INVENTION

The present invention relates to an apparatus for rapidly reconfiguring hard drives on a production computer in a hosting center where the production computer is to be used by more than one customer.

BACKGROUND OF THE INVENTION

Businesses that need additional computer processing capability may rent computers from a service provider for a period of time to perform the operations that are beyond the business's own computer capacity. Computers to perform the additional processing capability are located in grids where individual computers can be assigned to various customers for varying periods of time. These grids of computers are often referred to as "server farms," "delivery centers," or "hosting centers" and the computers in the grid are sometimes referred to as "production computers."

Server farms, delivery centers, and hosting centers have a need to quickly configure production computers for customer use after a prior customer has completed using the production computers assigned to the prior customer. Configuring production computers for the next customer normally takes considerable time because one of two possible events must occur before the new customer can begin using the production computers of the prior customer. The first possible event is that the hard drive on the production computer, containing the images for the previous customer, must be manually removed and the removed hard drive must be replaced with a new hard drive containing the images for the next customer. The second possible event is that the images on the hard drive must be removed and replaced electronically with the images for the next customer.

In order to increase the efficiency of leased computer time for computers in grid server farms, delivery centers, and hosting centers, the following problems must be solved. First, the need for personnel to manually swap hard drives must be eliminated. Manually changing hard drives can take several hours resulting in production computer down time as well as time lost to errors in handling. Second, the need to reload the system software after the prior customers work is completed, if not done by manually swapping the hard drive, must be accomplished in a manner that is rapid and that also leaves no doubt concerning the integrity of the removal of the prior customer's images. More specifically, the hard drive must be completely re-written in order to preclude any chance of one customer accidentally obtaining another customer's data. Third, a method must be devised to make the production machines available almost continuously.

SUMMARY OF THE INVENTION

The invention that meets the needs identified above is a fast provisioning unit that contains a basic unit, a duplicating unit and a control unit. The basic unit has a production computer and two or more hard drives each connected to the production computer by a first switch. The duplicating unit has a duplicator that is connected to an image disk and to a second switch. The second switch is connected to the hard drives of the basic unit. The control unit has a computer connected to the first switch, the second switch and the duplicator. The first switch permits the hard drives to be connected or disconnected from the production computer by the control computer pursuant to instructions from control software. While the production computer is in use by a first customer, the production computer is connected to a first hard drive, and a second hard drive is connected to a duplicator by a second switch. The duplicator may serve a larger number of production machines. The duplicator writes a new customized image onto the second hard drive for the next user of the production computer. The duplicator may do this in turn or in parallel depending on the number of hard drives to which it is connected by the control computer. Thus the second hard drive is loaded with the images for the next customer while the prior customer is using the production computer connected to the first hard drive. At the end of the prior customer's use of the production computer, the first switch effectively removes the first hard drive from the production computer and replaces the first hard drive on the production computer with the second hard drive. Because the second hard drive has been loaded with the necessary images for the next customer's operations, the production computer is ready immediately. Unintended access by the production computer or customer to a disconnected drive is not possible ensuring that one customer is not able to damage or corrupt the next customer's images.

DETAILED DESCRIPTION OF THE PREFERRED EMBODIMENT

As used herein, the term "computer grid" means a group of computers that are logically connected and that may be remotely accessed by one or more users in any selected combination. As used herein, the term "computer grid" shall include without limitation configurations sometimes referred to as "server farms," "delivery centers" or "hosting centers." As used herein, the term "Integrated Device Electronics" (IDE) means a type of disk-drive interface that has controlling electronics located on the drive itself so that a separate adapter card is not necessary. As used herein, the term "Small Computer System Interface" (SCSI) means a high speed parallel interface used to connect microcomputers to SCSI hard disks, computers, local area networks or other peripheral devices. As used herein, the term "image" means a duplicate of all or part of one of the following: a hard disk, a floppy disk, a section of memory, a section of hard drive, a file, a program, or data. As used herein, the term "disk duplicator" means a device capable of copying images from an "image disk" to a plurality one or more hard drives. As used herein, the term "image disk" means a disk or a hard drive containing custom operating system configuration, additional software and/or data for a specific customer. As used herein the term "switch" means an electronic (in the preferred embodiment) or electromechanical device that controls routing and operation of a signal path in response to instructions from a control computer. As used herein, the term "duplicator" means a disk duplicator connected to an "image disk." As used herein, the term "production computer" means a computer positioned within a computer grid and connected to a hard drive containing custom operating system configuration, additional software and/or data.

Figure 1:
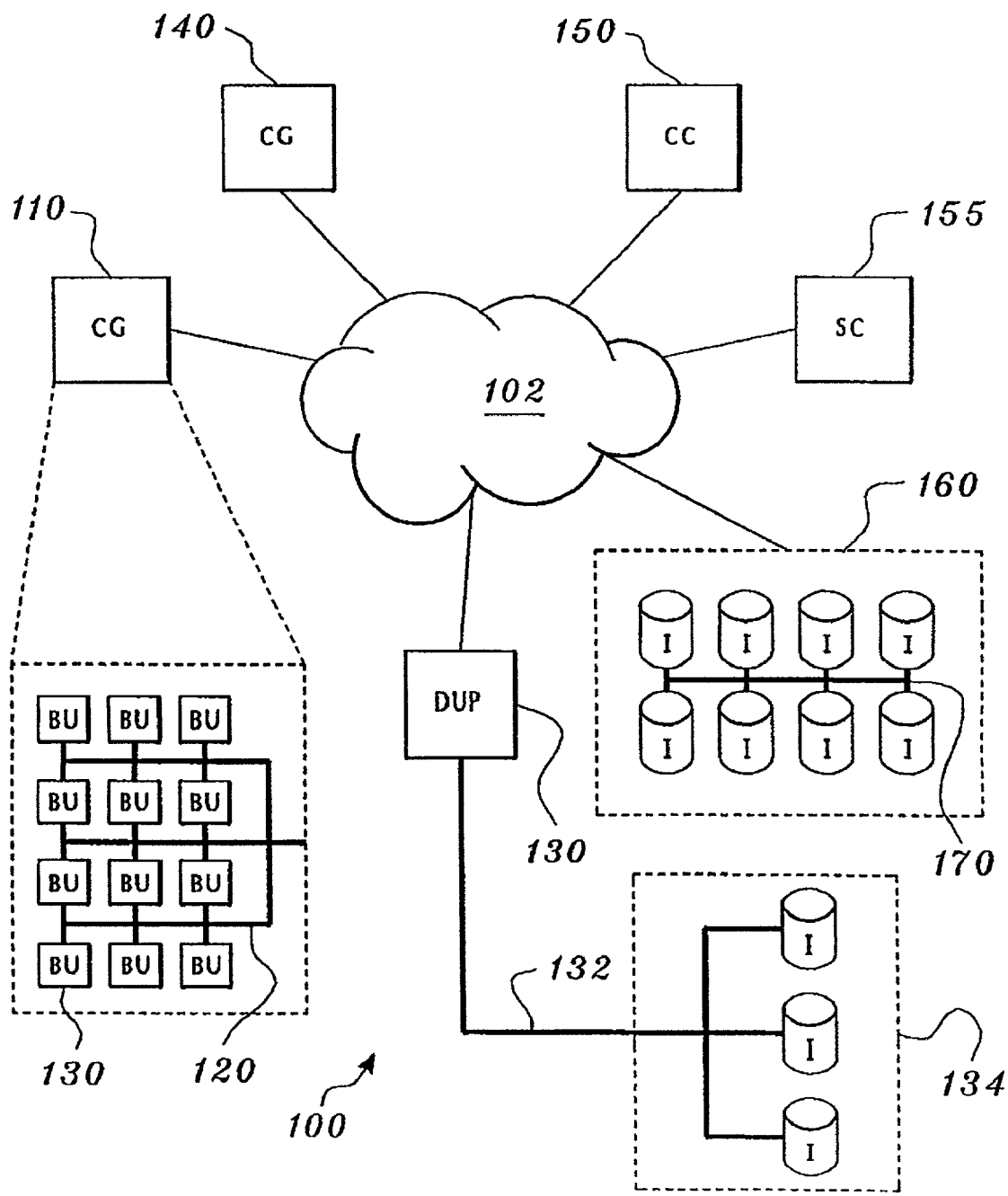
FIG. 1 is an illustration of a network containing the components of a fast provisioning system.

FIG. 1 depicts a distributed data processing system in which the present invention may be implemented and is intended as an example, and not as an architectural limitation, for the processes of the present invention. Distributed data processing system 100 is a network of computer grids, control computers, duplicators, and image banks, which contains a network 102, which is the medium used to provide communication links between the various devices and computers connected together within distributed data processing system 100. Network 102 may include permanent connections, such as wire or fiber optic cables, temporary connections made through telephone connections, temporary connections through the Internet, or other types of connections known to persons skilled in the art. In the depicted example, first computer grid 110 and second computer grid 140 are connected to network 102. Computer grid 110 is shown to contains a plurality of basic units 130 (see FIG. 4) connected by gild connection 120. Control computer 150 is connected to network 102. Server computer 155, first image bank 160 and duplicator 130 are connected to network 102. First image bank 160 contains a plurality of hard drives containing different images connected by image bank connector 170. Duplicator 130 is connected by line 132 to second image bank 134, which contains a plurality of hard drives containing different images.

For purposes of this application, a network computer is any computer, coupled to a network, which receives a program or other data from another computer coupled to the network. In the depicted example, control computer 150 coordinates the usage of the hosting centers, image banks, and duplicators. In the depicted example, distributed data processing system 100 includes the Internet with network 102 representing a worldwide collection of networks and gateways that use the TCP/IP suite of protocols to communicate with one another. Distributed data processing system 100 may also be implemented using a number of different types of networks 102, such as, an intranet, a local area network (LAN), or a wide area network (WAN).

Figure 2:
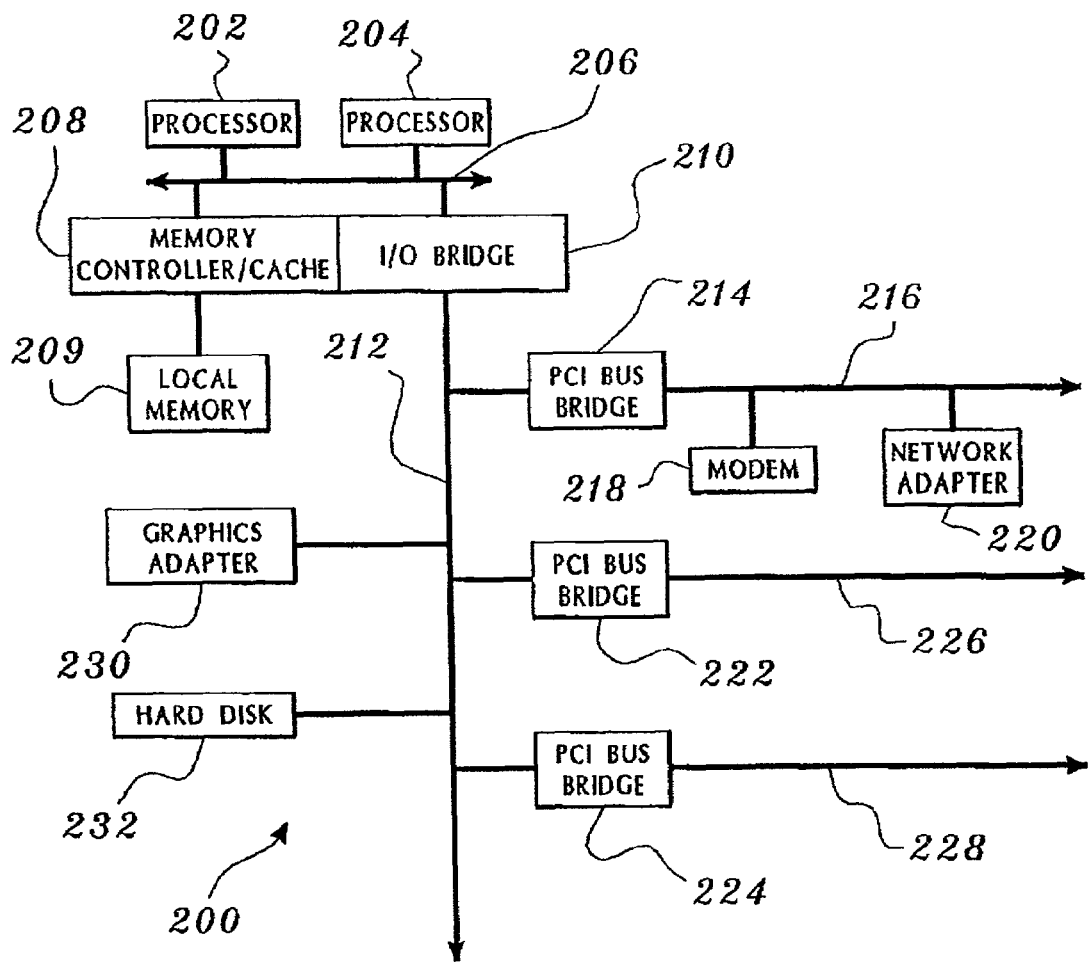
FIG. 2 is an illustration of a data processing system.

Referring to FIG. 2, a block diagram depicts a data processing system, which may be implemented as a server, such as server 155 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to first PCI local bus 216. Modem 218 may be connected to first PCI local bus 216. Typical PCI bus implementations will support four PCI expansion slots or add-in connectors. Communications links to clients 108, 110 and 112 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
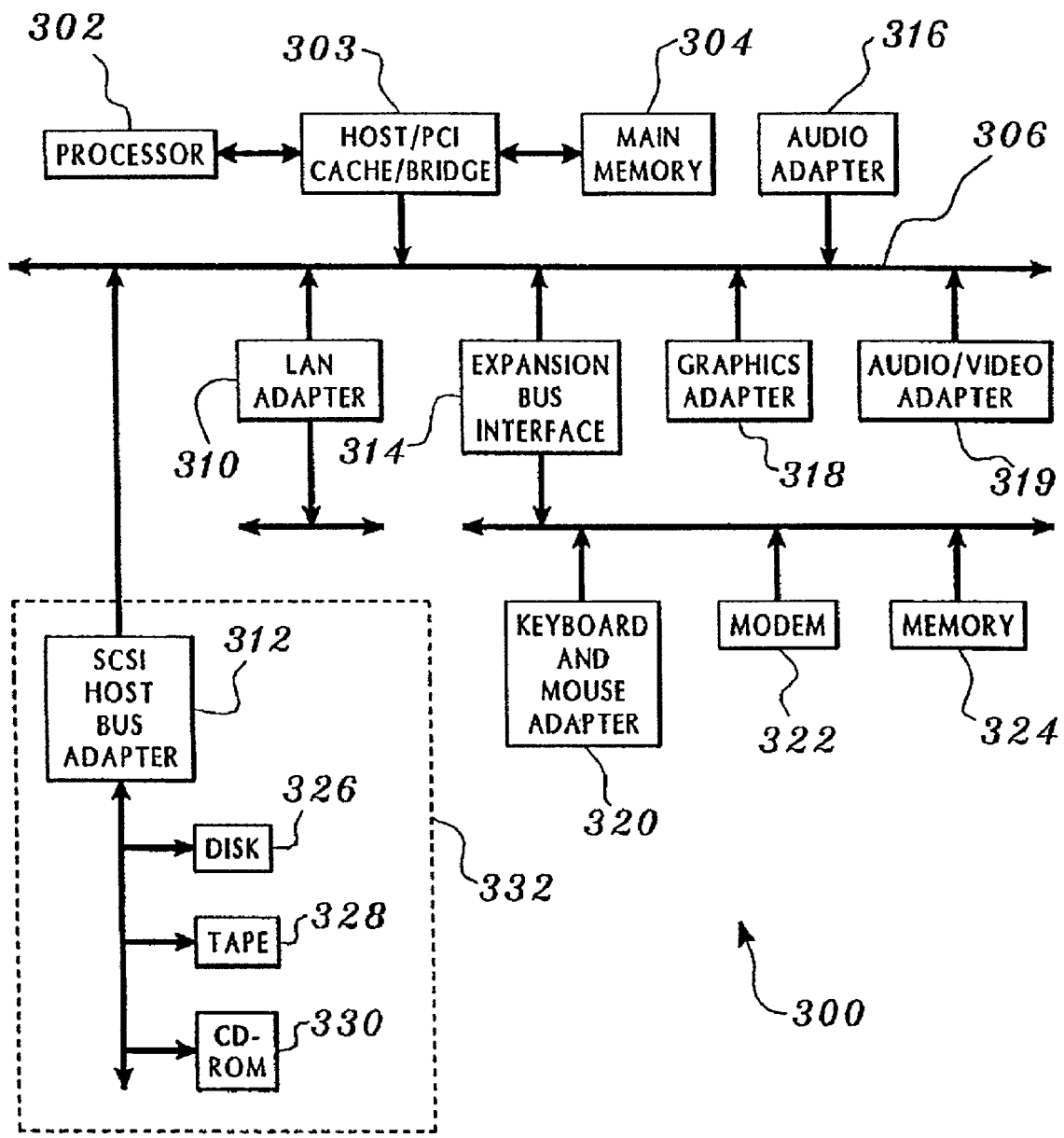
FIG. 3 is an illustration of a data processing system.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Figure 4:
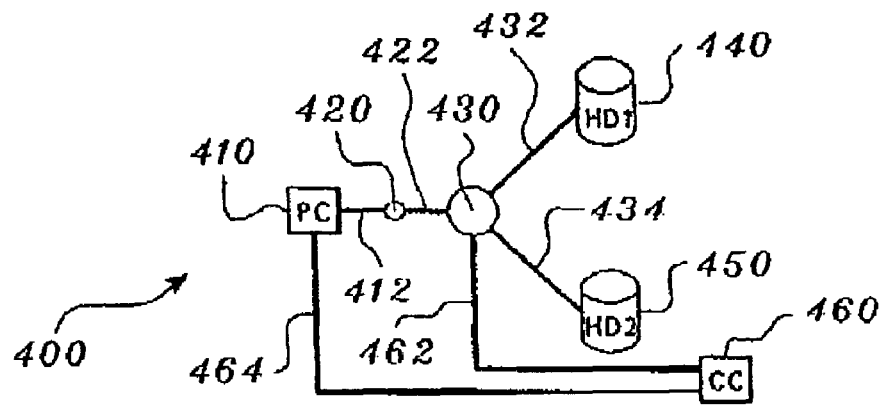
FIG. 4 is a depiction of a basic unit.

FIG. 4 depicts basic unit 400. Basic unit 400 has production computer 410, first switch 430, first hard drive 440 and second hard drive 450. Production computer 410 is connected to port 420 by line 412 and port 420 is connected to first switch 430 by line 422. First hard drive 440 is connected to first switch 430 by line 432 and second hard drive 450 is connected to first switch 430 by line 434. First switch 430 may be any suitable hardware signal switch known to persons skilled in the art. Port 420 may be an IDE or SCSI interface. First switch 430 allows production computer 410 to run operations for one customer until the customer's operations are completed or until the customer's contracted time has elapsed, at which time first switch 430 moves from a first position connecting production computer 410 to first hard drive 440 by line 432 to a second position connecting production computer 410 to second hard drive 450 by line 434. Second hard drive 450 contains the images necessary for second customer's operations to be run. Because the switch from first hard drive 440 to second hard drive 450 takes place electronically, there is no need to manually change the hard drive for production computer 410. First switch 430 moves from a first position to a second position or a second position to a first position as directed by control computer 460. First switch 430 is connected to control computer 460 by line 462. Production computer 410 is connected to control computer 460 by line 464. Control computer 460 is not part of basic unit 400 and is part of control unit 425 discussed in FIG. 5. Basic unit 400 may operate with only one hard drive connected to first switch 430 so long as first switch 430 is in a position to connect production computer 410 to the single hard drive. For example, if first hard drive 440 were removed for any reason, basic unit 400 would operate so long as first switch 430 is in its second position connecting production computer 410 to second hard drive 450 by line 434.

Figure 5:
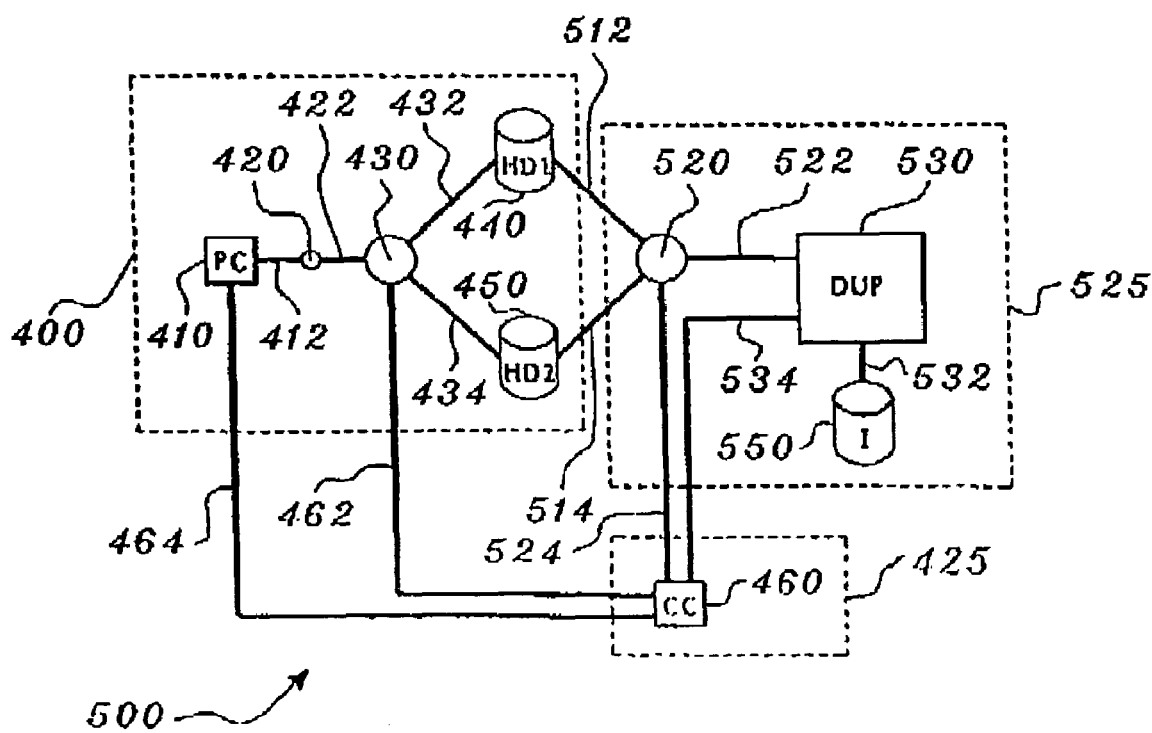
FIG. 5 is a depiction of an fast positioning unit.

FIG. 5 depicts fast provisioning unit (FPU) 500 having basic unit 400, duplicating unit 525, and control unit 425. Basic unit 400 is as described in FIG. 4. Duplicating unit 525 has duplicator 530, image disk 550 and second switch 520 connected to basic unit 400 by line 512 and line 514. Control unit 425 has control computer 460 connected to basic unit 400 by line 462 and line 464 and connected to duplicating unit 525 by lines 524 and 534.

When all three elements are connected, FPU 500 has production computer 410, first switch 430, first hard drive 440, second hard drive 450, second switch 520, duplicator 530, image disk 550, and control computer 460. Second switch 520 may be any suitable hardware signal switch known to persons skilled in the art. Control computer 460 is connected to production computer 410, to first switch 430, to second switch 520, and to duplicator 530. Duplicator 530 is connected by line 532 to image disk 550. FPU 500 allows the disconnected hard drive to be loaded with an image sent from duplicator 530. For example, if for a first customer, production computer 410 is connected to first hard drive 440 by first switch 430, production computer 410 will be disconnected simultaneously from second hard drive 450. Duplicator 530 is connected to second hard drive 450 and simultaneously disconnected from first hard drive 440 by second switch 520. Images from image disk 550 can be copied to second hard drive 450 pursuant to instructions from control computer 460. When the first customer's operations are completed or the first customer's contracted time has elapsed, control computer 460 will cause production computer 410 to shut down and then will cause the first switch 430 to move from a first position connecting first hard drive 440 to production computer 410 by line 432 to a second position connecting second hard drive 450 to production computer 410 by line 434. Second hard drive 450 contains the images necessary for the second customer's operations and the second customer's operations can begin immediately without time being spent to manually change the hard drive or to electronically reload images. Simultaneously, control computer 460 will cause second switch 520 to move from a first position connecting second hard drive 450 to duplicator 530 by line 514 to a second position connecting first hard drive 440 to duplicator 530 by line 512. Control computer 460 is connected to production computer 410 by line 464 so that a range of instructions can be sent to production computer 410 from a simple reset to a complete shutdown and reboot. For example, control computer 460 may communicate via line 464 with the software presently running in production computer 410 to place production computer 410 in a suitable state for saving the present customer's images before production computer 410 switches to another customer.

Control computer 460 now causes duplicator 530 to load images from image disk 550 to first hard drive 440 in preparation for a third customer's use of production computer 410 so that when it is the third customer's turn to employ production computer 410, first hard drive 440 will already contain the necessary images when first hard drive 440 is connected to production computer 410 by a movement of first switch 430 from a second position to a first position. Control computer 460 positions first switch 430 and second switch 520 so that duplicator 530 is never connected to the same hard drive that is connected to production computer 410. The logic of the switching system is that first switch 430 will always be in a position opposite to that of second switch 520. In other words, duplicator 530 will never be connected to a hard drive that is connected to production computer 410 at the same time that the hard drive is connected to production computer 410. Control computer 460 may also instruct duplicator 530 to save images from the hard drive that is coming off line and to store the images on an image disk or any suitable media that may be requested by a customer.

Figure 6:
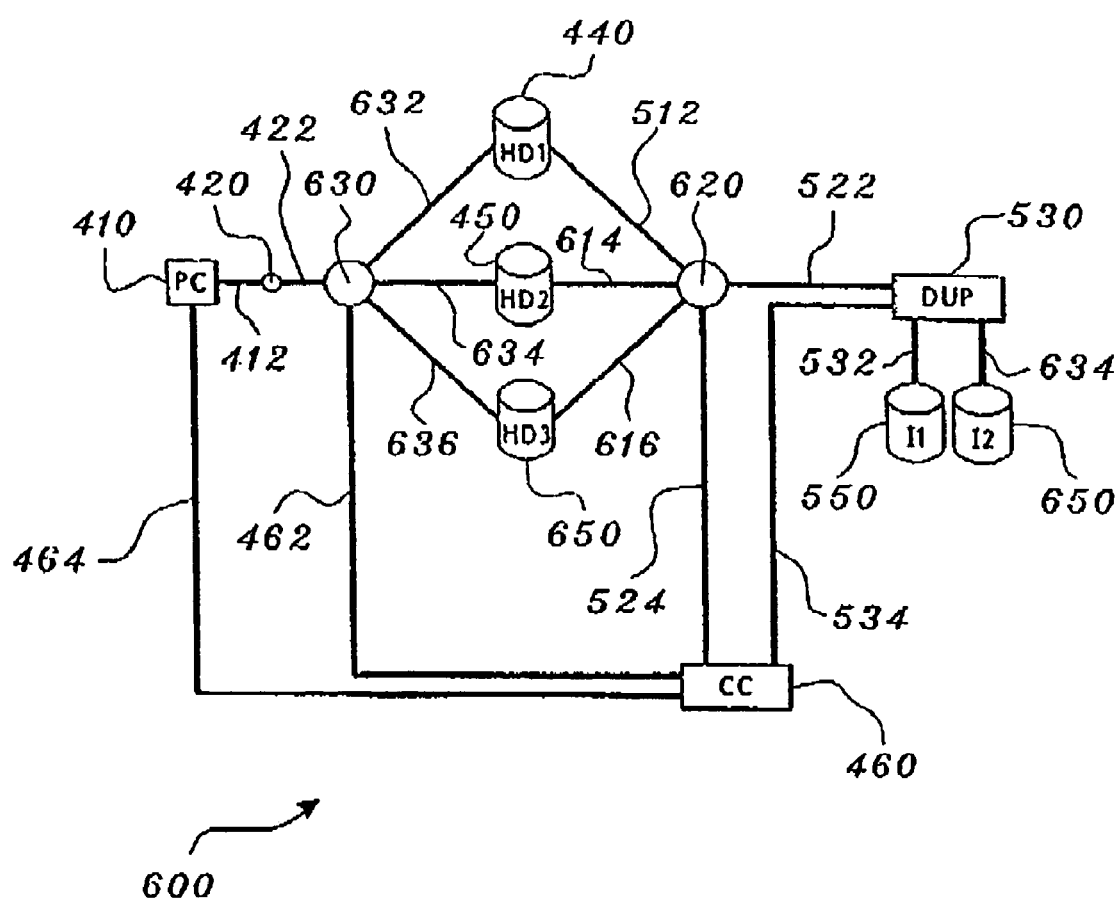
FIG. 6 is a depiction of an alternate fast positioning unit.

FIG. 6 depicts alternate fast provisioning unit (AFPU) 600 having production computer 410 connected to first multiple switch 630 and duplicator 530 connected to second multiple switch 620. First multiple switch 630 is connected to production computer 410 by line 422 and to first hard drive 440 by line 632, second hard drive 450 by line 634 and to third hard drive 650 by line 636. Duplicator 530 is connected to second multiple switch 620 by line 522. Second multiple switch 620 is connected to first hard drive 440 by line 512, to second hard drive 450 by line 614 and to third hard drive 650 by line 616. Duplicator 530 is connected to first image drive 550 by line 532 and to second image drive 650 by line 634. AFPU 600 shows that any number of hard drives can be connected to production computer 410 and to duplicator 530 by the use of multiple switches. Likewise, duplicator 530 can be connected to any number of image drives such as first image drive 550 and second image drive 650. The positions of first multiple switch 630 and second multiple switch 620 are controlled by control computer 460 so that production computer 410 and duplicator 530 will never be connected to the same hard drive at the same time.

Figure 7:
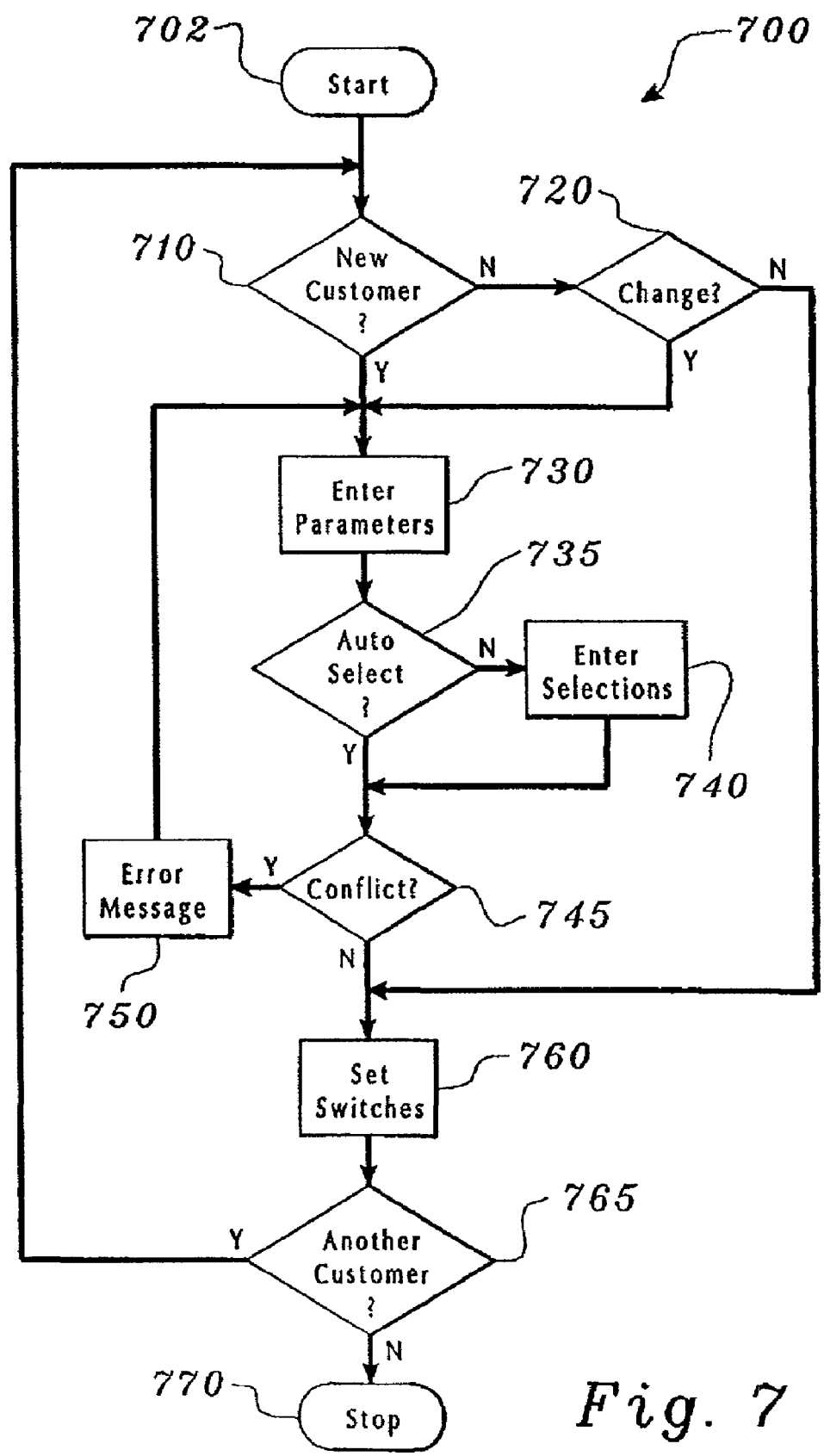
FIG. 7 is a flow chart of a first control program.

FIG. 7 depicts a flow chart for first control program 700 residing in control computer 460. Control program 700 starts (702). A determination is made as to whether a new customer is being entered (710). If a new customer is not being entered, then a determination is made as to whether there is a change for the existing customer (720). If there is no change for the existing customer, control program 700 goes to step 760. If there is a change of the existing customer, control program 700 goes to step 730. Likewise, if a determination is made that the customer is a new customer, control program 700 goes to step 730 and parameters for the customer are entered (730). A determination is made as to whether control program 700 will auto select the hardware settings (735). The hardware settings are the initial selection of computer grids, basic units and duplicators. If auto select is not used, then selections are entered manually (740). If auto select is used, then control program 700 chooses the hardware settings. A determination is made as to whether there are any conflicts in the settings (745). Conflicts may arise in scheduling of hardware if a certain hardware item is allocated to more than one customer at the same time. A conflict will also arise if hardware is allocated for a customer in a manner that the positions of the first switch and the second switch cannot be controlled by the control unit pursuant to the rule that a production computer and a duplicator will never be connected simultaneously to the same hard drive. If there are conflicts, an error message is displayed (750) and control program 700 goes to step 730, if there are no conflicts, control program 700 goes to step 760 and switches are set. A determination is made as to whether another customer is to be entered (765). If another customer is to be entered, control program 700 goes to step 710. If not, control program 700 ends (770).

Figure 8:
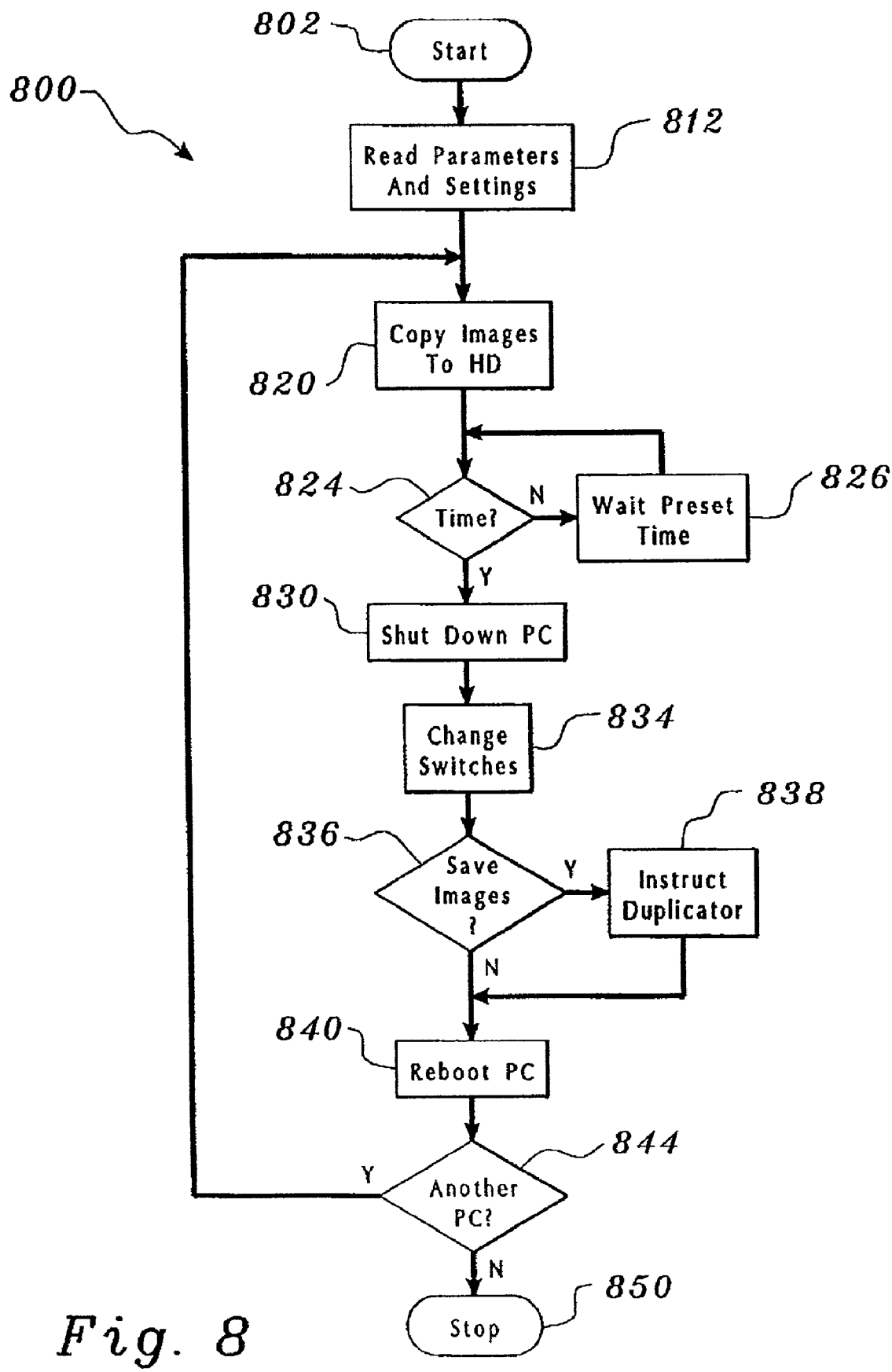
FIG. 8 is a flow chart of a second control program.

FIG. 8 depicts a flow chart for second control program 800 residing in control computer 460. Second control program 800 begins (802) and the parameters and settings that have been entered in first control program 700 are read (812). Second control program 800 issues instructions to the duplicator to copy images to a hard drive that is not presently connected to a production computer by a first switch but that will be connected when the first switch moves from a first switch first position to a first switch second position (or from a first switch second position to a first switch first position depending on the initial setting). Alternatively, if a first multiple switch and a second multiple switch are being used, instructions will be issued pursuant to the rule that that a production computer and a duplicator will never be connected simultaneously to the same hard drive. Second control program makes a determination as to whether the chronological time matches the time setting to change switch settings for the production computer (824). If the chronological time does not match the time setting for a switch for the production computer, then second control program 800 waits a preset time period (826) and returns to step 824. If the chronological time matches the time setting for a switch for the production computer, second control program 800 shuts down the production computer (830). Second control program 800 then changes the switch settings for both the first switch and the second switch to positions that are opposite to the initial settings and pursuant (1) to the rule that when a first switch is in a first switch first position, a second switch will be in a second switch second position and when a first switch is in a first switch second position, a second switch will be in a second switch first position, and (2) for multiple switches, that a production computer and a duplicator will never be connected simultaneously to the same hard drive. A determination is made as to whether the customer, whose time has expired, requested to save the images on the hard drive that is to be disconnected from the production computer. If the customer has requested that the images be saved, the second control program 800 sends instructions to the duplicator to save the images to an image disk or other media requested by the customer (838). If the customer has not requested the images to be saved, second control program 800 goes to step 840 and second control program 800 reboots the production computer (840). In the preferred embodiment, step 838 and step 840 are conducted in parallel. Step 838 and step 840 can be performed at the same time due to the structure of FPU 500 and AFPU 600 that allows control computer 460 to send instructions to production computer 410 and to duplicator 530 at the same time and that a production computer and a duplicator will never be connected simultaneously to the same hard drive. A determination is made as to whether another production computer is to be configured (844). If another production computer is to be configured, then second control program 800 goes to step 820. If there is not another production computer to be configured, second control program 800 ends (850).

Those of ordinary skill in the art will appreciate that the hardware and components in FIGS. 1 through 6 may vary depending on the implementation. For example, the computer grids may contain any number of basic units and the image banks may contain any number of image disks. Furthermore, any number of computer grids, control computers, server computers, image banks and duplicators may be connected in any combination provided that the elements of the fast provisioning unit are connected to operate as disclosed. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A fast provisioning unit for configuring a computer shared by more than one user to access storage disks, the fast provisioning unit comprising:
   a first switch;
   a second switch;
   a first storage disk connected to the switch and to the second switch;
   a second storage disk connected to the first switch and to the second switch;
   a duplicating unit connected to the second switch through an Internet connection; and
   a control unit connected to the first switch and to the second switch;
   wherein the duplicating unit alternately copies an operating system configuration to the first storage disk and the second storage disk after a user completes operations on the computer;
   wherein the control unit alternately connects the computer to the first storage disk and the second storage disk after a user completes operations on the computer so that the computer is never connected to a storage disk that is concurrently connected to the duplicating unit.

2. The fast provisioning unit of claim 1 wherein:
   the duplicating unit comprises a duplicator connected to an image disk having the operating system configuration stored thereon; and
   the duplicator is programmed to copy the operating system configuration from the image disk to the second storage disk while the first storage disk is coupled to the production computer through the first switch.

3. The fast provisioning unit of claim 1 wherein:
   the control unit is programmed to operate the first switch to disconnect the first storage disk from the computer and simultaneously connect the second storage disk to the computer, and to operate the second switch to disconnect the second storage disk from the duplicating unit and simultaneously connect the first storage disk to the duplicating unit.

4. A fast provisioning unit for configuring a computer shared by more than one user to access storage disks, the fast provisioning unit comprising:
   a first switch;
   a second switch;
   a first storage disk connected to the first switch and to the second switch;
   a second storage disk connected to the first switch and to the second switch;
   a duplicating unit connected to the second switch;
   wherein the duplicating unit comprises a duplicator connected to an image disk having the operating system configuration stored thereon;
   wherein the duplicator is programmed to copy the operating system configuration from the image disk to the second storage disk while the first storage disk is coupled to the production computer through the first switch; and
   a control unit connected to the first switch and to the second switch;
   wherein the control unit is programmed to operate the first switch to disconnect the first storage disk from the computer and simultaneously connect the second storage disk to the computer, and to operate the second switch to disconnect the second storage disk from the duplicating unit and simultaneously connect the first storage disk to the duplicating unit;
   wherein the duplicating unit alternately copies an operating system configuration to the first storage disk and the second storage disk after a user completes operations on the computer; and
   wherein the control unit alternately connects the computer to the first storage disk and the second storage disk after a user completes operations on the computer so that the computer is never connected to a storage disk that is concurrently connected to the duplicating unit.

5. A fast provisioning unit for configuring a computer shared by more than one user to access storage disks, the fast provisioning unit comprising:
   a first switch;
   a second switch;
   a first storage disk connected to the first switch and to the second switch;
   a second storage disk connected to the first switch and to the second switch;
   an image disk having an operating system configuration stored thereon;
   a duplicating unit means for copying the operating system configuration from the image disk to the first storage disk while the second storage disk is coupled to the computer through the first switch; and
   a control unit means for
     operating the first switch to disconnect the second storage disk from the computer and simultaneously connect the first storage disk to the computer, and
     operating a second switch to disconnect the first storage disk from the duplicating unit and simultaneously connect the second storage disk to the duplicating unit;
   whereby the computer is alternatively connected to the first storage disk and the second storage disk after each user completes operations on the computer, the computer is never connected to a storage disk that is concurrently connected to the duplicating unit, and the duplicating unit copies the operating system configuration to a storage disk after each user completes operations on the computer.

* * * * *

UNITED STATES PATENT AND TRADEMARK OFFICE
CERTIFICATE OF CORRECTION

PATENT NO.     : 6,959,312 B2
DATED          : October 27, 2005
INVENTOR(S)    : Berstis et al.

It is certified that error appears in the above-identified patent and that said Letters Patent is hereby corrected as shown below:

Column 9,
Line 7, "the switch" should be -- the first switch --.

Signed and Sealed this

Tenth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,959,312 B2
DATED : October 25, 2005
INVENTOR(S) : Berstis et al.

It is certified that error appears in the above-identified patent and that said Letters Patent is hereby corrected as shown below:

Column 9,
Line 7, "the switch" should be -- the first switch --.

This certificate supersedes Certificate of Correction issued January 10, 2006.

Signed and Sealed this

Seventh Day of February, 2006

JON W. DUDAS
*Director of the United States Patent and Trademark Office*